United States Patent [19]

Clark et al.

[11] Patent Number: 4,879,637

[45] Date of Patent: Nov. 7, 1989

[54] LIGHT CONTROL CIRCUIT FOR VANITY MIRROR ASSEMBLY

[75] Inventors: Russell L. Clark, Zeeland; Kim L. Van Order, Hamilton; Michael J. Suman; Todd A. Zandbergen, both of Holland, all of Mich.

[73] Assignee: Prince Corporation, Holland, Mich.

[21] Appl. No.: 267,178

[22] Filed: Nov. 4, 1988

[51] Int. Cl.$^4$ ............................................. F21V 33/00
[52] U.S. Cl. .................................. 362/141; 362/144; 338/176; 296/97.5
[58] Field of Search .............. 362/135, 137, 140–144; 338/176, 194, 333; 132/291, 296, 301, 304, 310; 296/97.1, 97.5

[56] References Cited

U.S. PATENT DOCUMENTS

| | | | |
|---|---|---|---|
| 4,000,404 | 12/1976 | Marcus | 362/137 |
| 4,203,149 | 5/1980 | Viertel et al. | 362/144 |
| 4,213,112 | 7/1980 | Alman et al. | 338/176 |
| 4,227,242 | 10/1980 | Marcus | 362/137 |
| 4,435,691 | 3/1984 | Ginn | 338/176 |
| 4,586,788 | 5/1986 | Hansen | 296/97 B |
| 4,733,336 | 3/1988 | Skogler et al. | 362/142 |
| 4,744,645 | 5/1988 | Sharp | 362/135 |
| 4,760,503 | 7/1988 | Vanden Berge et al. | 362/137 |

*Primary Examiner*—Carroll B. Dority
*Attorney, Agent, or Firm*—Price, Henveld, Cooper, DeWitt & Litton

[57] ABSTRACT

A dimming control circuit for use in an illuminated vanity mirror includes a surface formed variable resistor on a circuit board and wiper contacts engaging the resistor. One of the resistor or wiper contacts is movably mounted to a mirror frame with the other of the resistor or wiper contacts being stationary such that the resistance can be varied to control the light intensity.

17 Claims, 3 Drawing Sheets

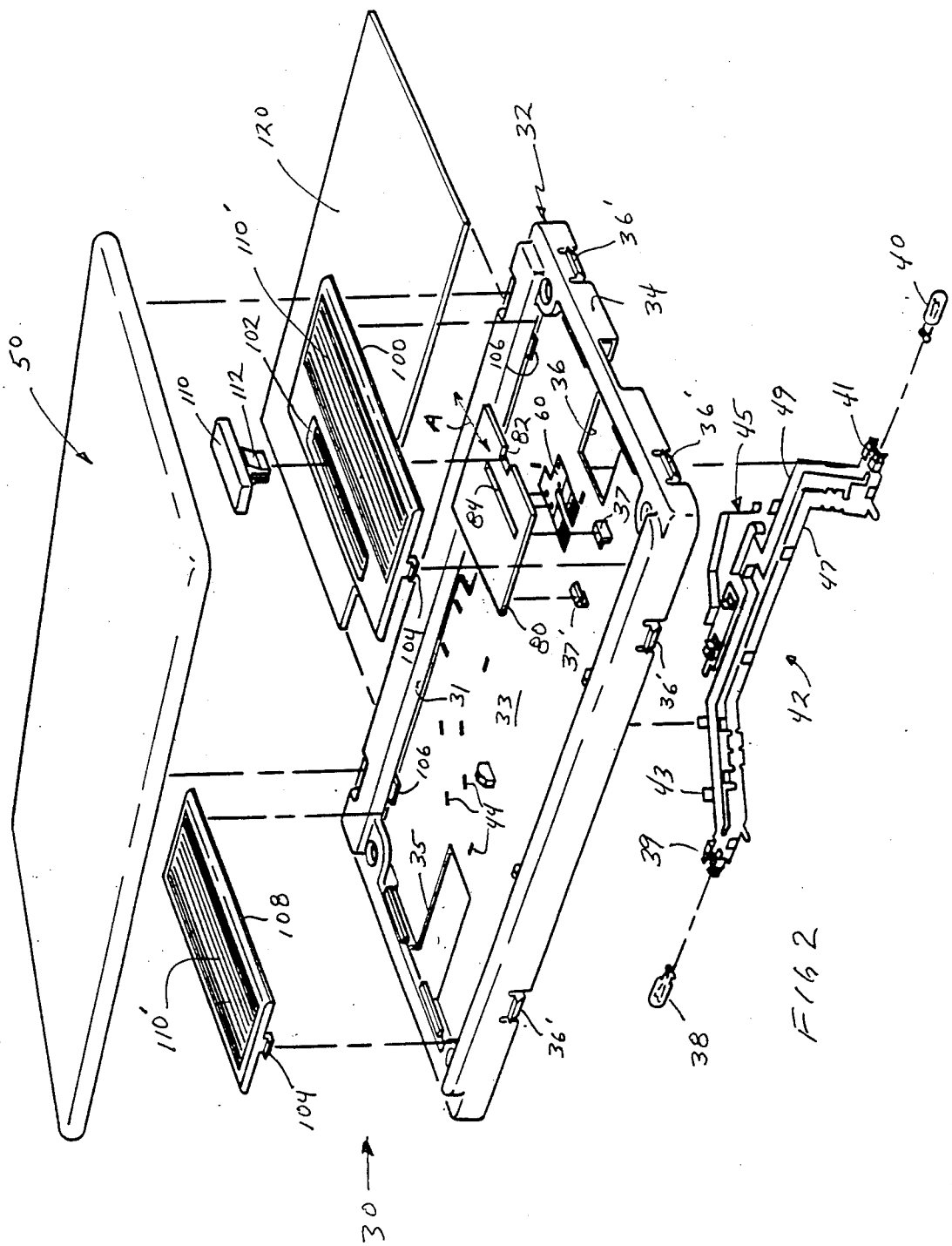

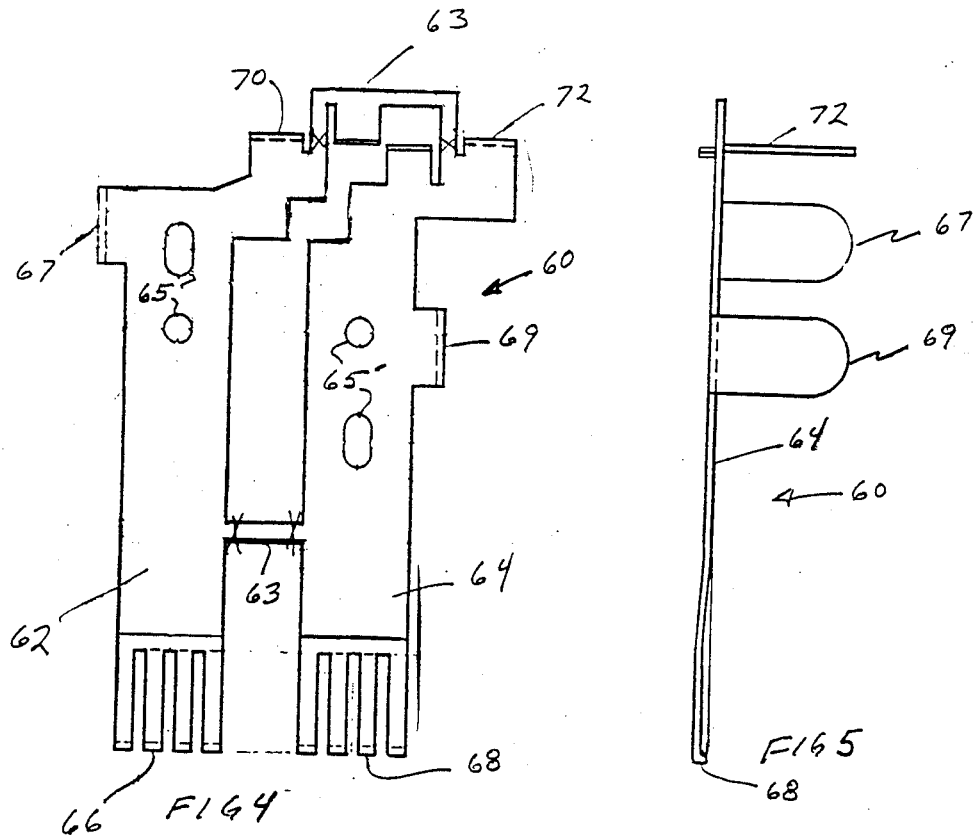
FIG 4
FIG 5
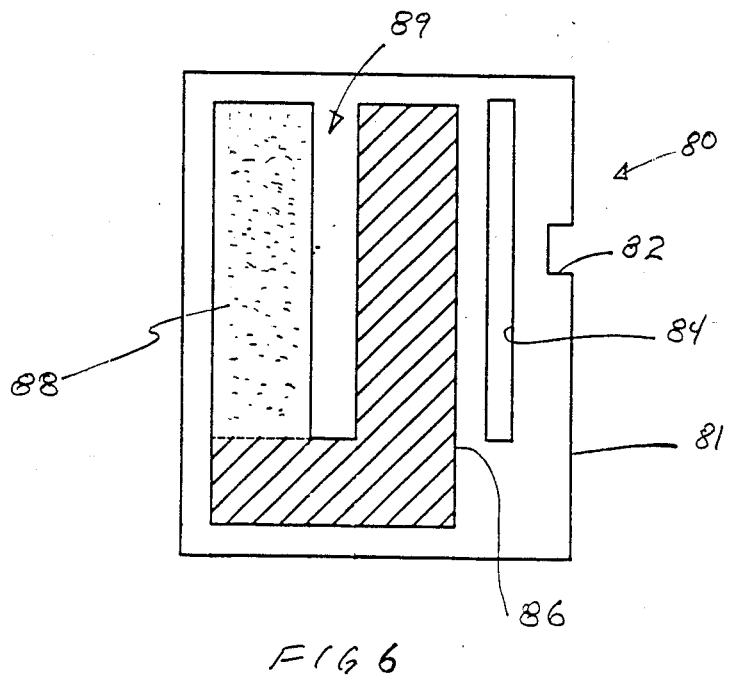
FIG 6

LIGHT CONTROL CIRCUIT FOR VANITY MIRROR ASSEMBLY

BACKGROUND OF THE INVENTION

The present invention relates to a light control circuit for an illuminated vanity mirror assembly and particularly to a dimming circuit therefor.

Illuminated vanity mirror assemblies are frequently installed in visors for vehicles. U.S. Pat. No. 4,000,404 discloses such a system including in FIG. 15 thereof, a dimming control for providing variable adjustment of the light intensity from the lamps associated with the vanity mirror. The system disclosed is relatively expensive requiring several solid state circuit elements in addition to a variable resistor for providing the dimming control. The utilization of a conventional rheostat, although providing desired dimming, adds considerable bulk and/or expense to a dimming control and can provide a relatively concentrated source of heat which could result in damage to the typically polymeric core utilized in the manufacture of the vanity. Other dimming controls for a vanity mirror installed in a visor are disclosed in U.S. Pat. No. 4,586,788 showing a dimming switch to assure that when the covered vanity mirror is opened, it is always opened in the dim position and U.S. Pat. No. 4,227,242 showing a dimming control as a function of cover movement. The latter two patents provide dimming control primarily to assure that when the cover is opened on the covered vanity mirror assembly, the user is not temporarily blinded by the high intensity of the light.

SUMMARY OF THE PRESENT INVENTION

The dimming control system of the present invention provides an infinitely adjustable light level from an illuminated vanity mirror and one particularly for use in connection with the covered vanity mirror type visor for use in a vehicle. It avoids the complexity and cost of prior art dimming circuits as well as the problems associated with a bulky discrete variable resistor by providing a vanity mirror having a frame with a circuit board and wiper contacts movably mounted with respect to each other in the frame. The circuit board includes a screen printed resistor thereon such that the contacts have a variable resistance between them. The contacts are coupled with lamp means for thus providing an adjustable current supplied to the lamps from the vehicle's power supply to control the light intensity.

In the preferred embodiment, the circuit board is movable with respect to fixed contacts. Also a control knob extends through a slot provided in the lens and engages the circuit board for sliding the board with respect to the fixed contacts. The system of the present invention thereby provides a flat relatively compact variable resistance in which heat is dissipated over a relatively large area and thereby does not affect the polymeric material employed in the vanity. Also a reliable and smooth operating dimming control at a reduced cost is provided. These and other features, objects and advantages of the present invention will become apparent upon reading the following description thereof together with reference to the accompanying drawings in which:

BRIEF DESCRIPTION OF THE DRAWINGS

FIG. 2 is an exploded perspective view of the illuminated vanity mirror assembly shown in FIG. 1;

FIG. 4 is a plan view of the wiper contacts employed in the assembly as shown schematically in FIG. 2;

FIG. 5 is a right side elevational view of the contacts shown in FIG. 4;

FIG. 6 is a plan view of the circuit board shown also in FIG. 2; and

DETAILED DESCRIPTION OF THE PREFERRED EMBODIMENT

Figure 1:
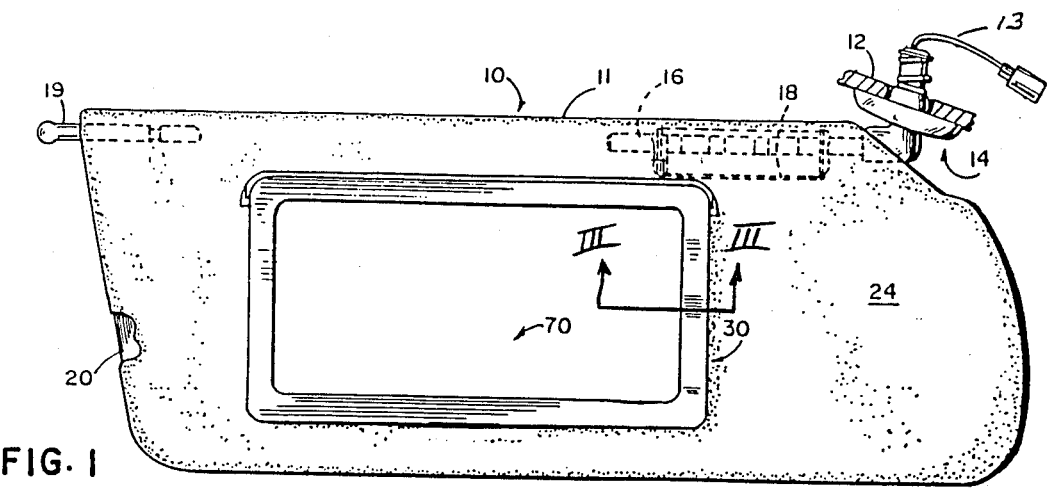
FIG. 1 is a perspective view of an illuminated vanity mirror visor embodying the present invention.

Referring initially to FIG. 1 there is shown a visor 10 mounted to the roof support 12 of a vehicle such as an automobile by a conventional elbow bracket pivot assembly 14. Assembly 14 includes a hollow horizontal axle 16 extending within the body of the visor near an upper edge 11 thereof. An electrical conductor 13 extends through the axle for providing a positive supply conductor to the illuminated vanity mirror assembly 30 with the connection of the metallic elbow 14 to the metallic roof providing the ground connection.

Visor 10 pivots on axle 16 by means of an internal torque device 18 which can be of the type described in U.S. Pat. No. 4,500,131 issued Feb. 19, 1985, and entitled VISOR CONTROL. This permits the visor 10 to be moved from a raised stored position against the vehicle headliner when not in use or pivoted downwardly to a lowered use position. The left edge of the visor remote from pivot connection 14 includes a stub axle 19 which fits within a suitable clip mounted to the vehicle for supporting the opposite end of the visor.

Visor 10 includes a body made of a polymeric core 20 typically molded in two halves which can be hinged together and which includes a generally rectangular recess centrally located in one side thereof for receiving an illuminated vanity mirror assembly 30. The visor core 20 is covered by a suitable upholstery material 24 to conform the visor appearance to that of the interior of a vehicle in which it is installed. The construction of the illuminated vanity mirror assembly 30 and the unique infinite dimming light control of the present invention is best understood initially by reference to FIG. 2 now described.

Vanity mirror assembly 30 includes a generally rectangular mirror frame 32 having a downwardly projecting peripheral wall 34 with outwardly projecting tabs 36' for snap-fitting the frame 32 within the body of the visor. Frame 32 includes an integral floor 33 with rectangular apertures 35 and 36 formed therein and centered at opposite ends and into which lamps 38 and 40 are centered. The lamps are mounted onto a stamped electrical circuit 42 including sockets 39 and 41 at opposite ends of conductors 42, 47 and 49 thereof for receiving lamps 38 and 40. The electrical circuit 42 defines an electrical current flow path for bulbs 38 and 40 as described in greater detail below in connection with FIG. 7. Circuit 42, including the sockets and conductors, is mounted to the under surface of frame 32 by means of suitable tabs 43 which extend through aligned slots 44 formed in floor 33 and subsequently are bent to hold the circuit in place. Similarly, an electrical switch 45 is stamped as part of the electrical circuit 42 and is of the type which cooperates with cover 50 of the assembly in the same manner as disclosed in U.S. Pat. No. 4,760,503, issued on July 26, 1988, to VandenBerge et al the disclosure of which is incorporated herein by reference.

Fixedly mounted to the top surface of floor 33 of frame 32 is a generally U-shaped electrical wiper contact assembly 60 which is heat staked and is fixed in position with respect to floor 33. Contact 60 communicates with the two conductors 47 and 49 of the electrical circuit 42 by means of apertures formed in the floor 33 as described in greater detail below in connection with FIGS. 4 and 5.

Movably positioned to slide in a direction indicated by arrow A in FIG. 2 is a printed circuit board 80 which is slidably mounted by a plurality of generally inverted L-shaped guides 37 and 37' extending upwardly and inwardly from floor 33. Circuit board 80 overlies wiper contacts 60 and includes a conductor and printed circuit resistor thereon which engages the wiper contacts 60 as described in greater detail below.

Overlying circuit board 80 is a first lens 100 including a slot 102 formed therein for allowing a knob 110 with a snap fitting projection 112 to extend downwardly through the lens and interlock with a notch 82 on circuit board 80 for controlling the sliding movement of the circuit board. Lens 100 includes tabs 104 at opposite ends for snap fitting the lens into apertures 106 in the bottom corners of frame 32. The left side of the vanity mirror frame likewise includes a lens 108 which, like lens 100, includes a plurality of lens forming facets 110' for directing light generally inwardly toward the center of the face of the user of the vanity mirror.

Mounted between the lenses is a vanity mirror 120 which rests on a peripheral flange 31 of frame 32 and which is held in place at opposite ends by a flange 101 (FIG. 3) on the inside edge of each of the snap-fitted lenses 100 and 108. Cover 50 includes sockets which snap fit over axle members 52 and 54 of frame 32 as described in U.S. Pat. No. 4,760,503 to provide a snap-open and snap-closed operation of the cover for selective use of the illuminated vanity mirror. Having described the major components of the system in connection with the diagram of FIG. 2, a detailed description of the individual components presented in connection with FIGS. 3–6 and the circuit operation in connection with FIG. 7 which follows.

Referring next to FIGS. 4 and 5 there is shown the fixed electrical wiper contact assembly 60 which is stamped from a suitable conductive material such as brass or the like. The structure 60 shown in FIGS. 4 and 5 as well as circuit stamping 42 in FIG. 2 are shown prior to final assembly, it being understood that there are several bridging members 63 which are subsequently cut away (at the X locations in FIG. 4) to form two independent contacts once the assembly 60 is mounted to the floor 33 of frame 32. Assembly 60 includes a first electrical contact leg 62 and a second electrical contact leg 64 (joined as shown in FIG. 5 by removable bridges 63 which are subsequently cut away). Leg 62 includes a mounting tab 67 near its top and as well as mounting apertures 65 which cooperate with heat-staked polymeric posts extending upwardly from the floor 33 of frame 32. Tab 67 extends downwardly through a slot in the floor for assisting and anchoring contact leg 62 to the mirror frame. The lower end of the leg 62 includes wiper contacts 66 which are upwardly curved and rounded at the end as best seen in connection with the similar contact 68 on leg 64 to provide a wiping action against the resistive and conductive material associated with circuit board 80. Leg 64 likewise includes a mounting tab 69 and apertures 65' for mounting leg 64 to the mirror frame. Tabs 67 and/or 69 may also provide as noted below, an electrical connection to the stamped circuit 42 mounted on the opposite side of floor 33 also by a heat-staking process. Supply contact tabs 70 and 72 associated with legs 62 and 64, respectively, near their upper ends provide terminals to which one or more electrical conductors from the vehicle's power source can be coupled to the terminal assembly 60. The spring-like contact tips 66 and 68 of the fixed contact assembly engage conductive and resistive areas on circuit board 80 which is now described in connection with FIG. 6.

Figure 3:
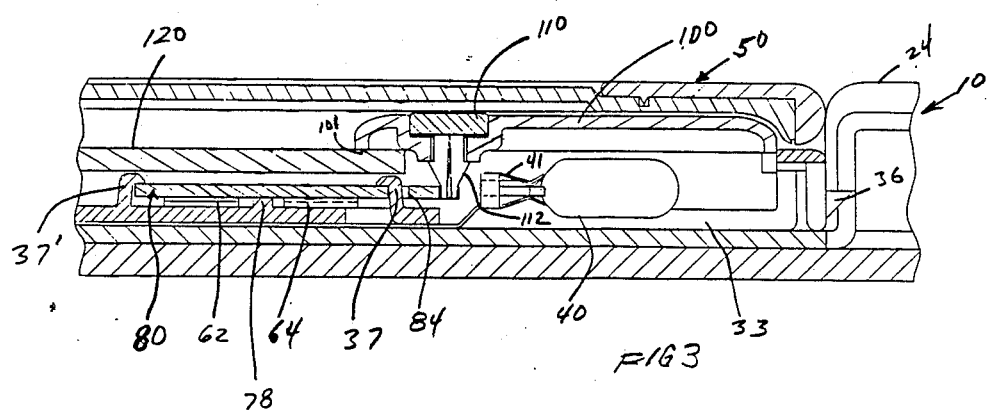
FIG. 3 is a fragmentary cross-sectional view taken along section lines III—III of FIG. 1.

Circuit board 80 includes a conventional fiberglass resin-type board 81 made of an insulative material with a notch 82 formed in the right edge as seen in FIG. 6 for receiving tab 112 (FIG. 2) of control slide 110. A second slot 84 is formed along the longitudinal axis of the board 81 near the right edge for receiving the retaining tab 37 therein as best seen in FIG. 3. The stationary tab 37 extends through slot 84 and has an overlying lip which operates in cooperation with tabs 37' on the left side of the board as seen in FIG. 3 for holding the circuit board in sliding engagement with the fixed contact assembly including legs 62 and 64.

The electrical circuit printed on the circuit board includes an inverted L-shaped section 86 of a conductive material such as copper which communicates with contact 68 of contact leg 64 and which is electrically coupled to a surface resistor 88 which extends upwardly to define in connection with the reversed L-shaped conductive member 86, a generally U-shaped circuit. The resistive material 88 can be applied in a conventional manner by screen printing on the substrate 81. The material 88 is of the type manufactured by Minico, Inc. of Chicago, Ill., part number M-1000-RS which is commercially available. The combination of contacts 66 and 68 in connection with the U-shaped circuit comprising resistor 88 and conductor 86 provide a variable resistor 89 for the electrical circuit as schematically shown in FIG. 7.

Figure 7:
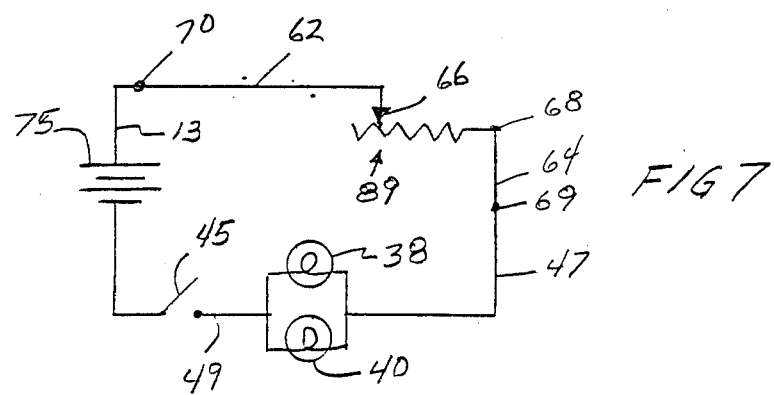
FIG. 7 is an electrical circuit diagram of the circuit of the present invention.

The circuit diagram of FIG. 7 shows the electrical coupling of wiper contacts 60 to the circuit board 80 and the interconnection of the lamps 38 and 40 through switch 45 to a vehicle power source represented by battery 75. The variable resistor 89 is defined by the conductive segment 86 which is in continuous contact with wiper arm 68 throughout the range of movement of board 80 with respect to the fixed contact 60 and resistive section 88 which engages wiper contact 66 except in the maximum brightness position in which contacts 66 and 68 are at the bottom of the U-shaped resistor 89 so formed to provide a maximum amount of current to the lamps 38 and 40. In the preferred embodiment of the invention, the resistance varied from approximately 0 Ohms for the maximum brightness position to 38 Ohms for the minimum brightness position represented by the contacts 66 and 68 being positioned near the upper portion of the U-shaped resistor 89. In FIG. 7 the approximate equivalence of the stamped circuit elements are marked with the corresponding electrical conductor segments, it being realized that in the embodiment shown, only power input tab 70 is employed in connection with the supply of outside power to the circuit and the interconnection of conductive leg 64 is made through the contact of mechanical holding tab 69 through the floor 33 of frame 32 in contact with one of the conductors 47 of the lamps. Naturally, other specific interconnections can be made depending upon the nature of the specific stampings employed to define the circuit conductors and if desired conventional wiring can also be employed for the interconnection of the lamps to the wiper contact assembly 60 and resistor board 80.

The assembled structure as seen in FIG. 3 showing the circuit board 80 slidably held under tabs 37 and 37' engaging the top surface of the board while the under surface of the board engages the wiper arms 62 and 64 of assembly 60. A polymeric guide 78 extends upwardly from floor 33 to provide intermediate support for the center of the board and which rides therealong in the notch portion of the U-shaped resistor 89 and thereby does not interfere with the electrical contact to the board. Slide 110 moves the board in a direction indicated by arrow A in FIG. 2 to move the U-shaped resistor 89 along the fixed tips 66 and 68 of wiper contact assembly 60 to vary the resistance and thereby the intensity of the illumination provided by the parallel coupled lamps 38 and 40.

The cover 50 includes arms which engage the switch 45 for closing the switch when cover 50 is open to expose the vanity mirror 120. As seen in FIG. 3, mirror 120 is held in place under the edge 101 of lens 100 and is similarly held in place on the opposite end by lens 110. Sufficient clearance is provided between the peripheral ledge 31 and the bottom of mirror 120 to allow the free-sliding movement of the circuit board 80 with respect to the wiper contact 60.

It will become apparent to those skilled in the art that various modifications to the preferred embodiment invention as described herein can be made without departing from the spirit or scope thereof as defined by the appended claims.

The embodiments of the invention in which an exclusive property or privilege is claimed are defined as follows:

1. An illuminated vanity mirror assembly including a variable resistance circuit for providing a dimming control comprising:
    an electrical circuit board having a resistance material extending along a predetermined length of one side of said board;
    electrical contact means for selectively engaging said resistance material;
    means for mounting said circuit board and said contact means for movement relative to each other to provide a variable resistance to said contact means; and
    means for electrically coupling said contact means to lamp means associated with the vanity mirror for selectively varying the intensity of light from said lamp means.

2. The apparatus as defined in claim 1 wherein said circuit board includes a conductive strip extending parallel and adjacent to said resistance material and electrically coupled to said resistance material.

3. The apparatus as defined in claim 2 wherein said contact means include a pair of contacts with one contact positioned to ride along said resistance material and the remaining contact coupled to ride along said conductive material such that as the contacts and circuit board move with respect to one another the resistance between said contacts varies.

4. The apparatus as defined in claim 3 wherein the illuminated vanity mirror assembly includes a frame and means for mounting said contacts and circuit board to said frame for movement with respect to one another.

5. An illuminated vanity mirror assembly including a variable resistance circuit for providing a dimming control comprising:
    an electrical circuit board having a resistance material extending along a predetermined length of one side of said board, wherein said circuit board includes a conductive strip extending parallel and adjacent to said resistance material and electrically coupled to said resistance material;
    electrical contact means for selectively engaging said resistance material, wherein said contact means include a pair of contacts with one contact positioned to ride along said resistance material and the remaining contact coupled to ride along said conductive material such that as the contacts and circuit board move with respect to one another, the resistance between said contacts varies;
    means for mounting said circuit board and said contact means for movement relative to each other to provide a variable resistance to said contact means;
    means for electrically coupling said contact means to lamp means associated with the vanity mirror for selectively varying the intensity of light from said lamp means, wherein the illuminated vanity mirror assembly includes a frame and means for mounting said contacts and circuit board to said frame for movement with respect to one another; and
    wherein said frame includes means for fixedly attaching said contacts and means for slidably moving said circuit board with respect to said contacts.

6. The apparatus as defined in claim 5 and further including a visor for use in connection with a vehicle and wherein said frame including said illuminated vanity mirror is mounted to said visor.

7. A vehicle visor including a variable resistance dimming control circuit for use in connection with an illuminated vanity mirror assembly mounted to said visor and including lamp means, said circuit comprising:
    an electrical circuit board having a surface resistor formed thereon;
    electrical contact means for selectively engaging said resistor;
    means for mounting said circuit board and said contact means for movement relative to each other to provide a variable resistance to said contact means;
    means for supplying operating power to the circuit; and
    means for electrically coupling said contact means to said lamp means associated with the vanity mirror and to said sources of power for selectively varying the intensity of light from said lamp means.

8. The apparatus as defined in claim 7 wherein said surface resistor includes a reversed L-shaped conductive strip and a leg of resistive material electrically coupled to said conductive strip to form a U-shaped resistor.

9. The apparatus as defined in claim 8 wherein said contact means include a pair of contacts with one contact positioned to ride along said resistive material and the remaining contact coupled to ride along said conductive strip such that as the contacts and circuit board move with respect to one another the resistance between said contacts varies.

10. The apparatus as defined in claim 9 wherein the illuminated vanity mirror assembly includes a frame and means for mounting said contacts and circuit board to said frame for movement with respect to one another.

11. A vehicle visor including a variable resistance dimming control circuit for use in connection with an illuminated vanity mirror assembly mounted to said visor and including lamp means, said circuit comprising:

an electrical circuit board having a surface resistor formed thereon, wherein said surface resistor includes a reversed L-shaped conductive strip and a leg of resistive material electrically coupled to said conductive strip to form a U-shaped resistor;

electrical contact means for selectively engaging said resistor, wherein said contact means include a pair of contacts with one contact positioned to ride along said resistive material and the remaining contact coupled to ride along said conductive strip such that as the contacts and circuit board move with respect to one another the resistance between said contacts varies;

means for mounting said circuit board and said contact means for movement relative to each other to provide a variable resistance to said contact means;

means for supplying operating power to the circuit;

means for electrically coupling said contact means to said lamp means associated with the vanity mirror and to said source of power for selectively varying the intensity of light from said lamp means, wherein the illuminated vanity mirror assembly includes a frame and means for mounting said contacts and circuit board to said frame for movement with respect to one another; and wherein said frame includes means for fixedly attaching said contacts and means for slidably moving said circuit board with respect to said contacts.

12. A vehicle visor having an illuminated vanity mirror comprising:

a visor body;

a mirror frame including a peripheral inwardly extending ledge for supporting a mirror thereon and lens receiving slots at opposite edges;

a mirror positioned on said ledge and extending adjacent said lens slots; and lens means snap fitted into said slots and including a flange overlying at least a portion of an edge of said mirror at opposite ends of said mirror for holding said mirror to said frame.

13. The apparatus as defined in claim 12 and further including lamp means positioned behind said lens means and means for varying the intensity of light from said lamp means.

14. The apparatus as defined in claim 13 wherein means for varying the light intensity comprises a dimming circuit which includes an electrical circuit board having a resistance material extending along a predetermined length of one side of said board, electrical contact means for selectively engaging said resistance material, means for mounting said circuit board and said contact means for movement relative to each other to provide a variable resistance to said contact means, and means for electrically coupling said contact means to said lamp means for selectively varying the intensity of light from said lamp means.

15. The apparatus as defined in claim 14 wherein said circuit board includes a conductive strip extending parallel and adjacent to said resistive material and electrically coupled to said resistive material.

16. The apparatus as defined in claim 15 wherein said contact means include a pair of contacts with one contact positioned to ride along said resistive material and the remaining contact coupled to ride along said conductive material such that as the contacts and circuit board move with respect to one another the resistance between said contacts varies.

17. The apparatus as defined in claim 16 and further including a visor for use in connection with a vehicle and wherein said frame including said illuminated vanity mirror is mounted to said visor.

* * * * *